United States Patent [19]

Bobbitt, Jr.

[11] 3,938,621

[45] Feb. 17, 1976

[54] VEHICLE SERVICING SYSTEM

[75] Inventor: William C. Bobbitt, Jr., Philadelphia, Pa.

[73] Assignees: Rudolph Hafner; John Hafner, both of Southampton, Pa. ; part interest to each

[22] Filed: June 6, 1973

[21] Appl. No.: 367,454

[52] U.S. Cl. .............. 184/1.5; 137/172; 137/234.6; 49/33

[51] Int. Cl.² .............................................. F16C 3/14

[58] Field of Search .......... 137/234.6, 172; 184/1.5; 52/169, 174; 4/10, 146; 49/33

[56] References Cited

UNITED STATES PATENTS

| | | | |
|---|---|---|---|
| 1,654,073 | 12/1927 | Fagan | 184/1.5 |
| 1,658,044 | 2/1928 | Fagan | 184/1.5 X |
| 1,702,477 | 2/1929 | Lucas | 184/1.5 |
| 2,021,145 | 11/1935 | Dyar | 4/146 X |
| 2,499,115 | 2/1950 | Shobe | 4/10 |
| 3,223,243 | 12/1965 | Muller | 137/172 X |

*Primary Examiner*—Harold W. Weakley
*Attorney, Agent, or Firm*—Paul Maleson; Morton J. Rosenberg

[57] ABSTRACT

A vehicle servicing system for permitting operators to service and maintain their vehicles. The system includes a housing having an upper and lower level. A vehicle is positioned on the upper level over a slideably moveable door. The operator then decends to the lower level and inserts monies into a moveable door mechanism. Actuation of the door mechanism slides the moveable door away, thus providing the operator access to the underside of the vehicle for a specific length of time. The operator may service the vehicle during the time access is provided. An automatic timing mechanism actuates the moveable door mechanism to close the door after the alloted time is used. Specific embodiments of the servicing system provide mechanisms for draining oil from the vehicles during service.

2 Claims, 6 Drawing Figures

VEHICLE SERVICING SYSTEM

BACKGROUND OF THE INVENTION

1. Field of the Invention

This invention relates to systems for providing maintenance and service to vehicles. In particular, this invention pertains to systems which permit vehicle operator's to service their own vehicle. More in particular, this invention relates to systems for servicing vehicles which are automatically coin operated.

2. Prior Art

Vehicle servicing systems having a pit area where work is accomplished from beneath a vehicle are known in the art. However, in some prior systems having pit areas, vehicle undersides are fully accessible. In such prior systems, the vehicles are not accessible for servicing for a specific time interval. Thus, such systems do not provide for automatic operation of the system when operator's are servicing their own vehicles. Such prior systems would thus require a service attendent to be present to restrict the time in which the operator's could service their vehicles. Requiring the presence of a service attendant would greatly increase the cost of operation of the vehicle servicing system.

Other prior systems provide for oil drainage tanks, however, such are usually provided in direct line with the vehicle being drained. Such prior systems do not have oil drainage conduits within the walls of the pit area to minimize a fire hazard. Further, such systems do not show a water reservoir below the pit area to aid in fire control in the case of an accident. Such prior systems make working in the pit area a hazardous chore which may have deleterious results.

SUMMARY OF THE INVENTION

A vehicle servicing system having vehicle housing means with an upper level and a lower level. The servicing system includes a mechanism for positioning at least one vehicle in a predetermined location within the upper level of the vehicle housing means. A removeable door mechanism is positioned between the upper and lower levels of the vehicle housing means and is located under the vehicle when the vehicle is in the predetermined location. The removeable door mechanism is removeable from under the vehicle responsive to an operator's control for servicing the vehicle from the lower level of the vehicle housing means.

DESCRIPTION OF THE PREFERRED EMBODIMENTS

Referring now to FIGS. 1, 2, 3 and 4 there is shown vehicle servicing system 10 for maintenance and servicing of vehicles. In particular, system 10 provides the capability of permitting the operator of a vehicle to service it himself for a predetermined length of time. The operator or driver of the vehicle inserts a predetermined amount of money into a coin operated mechanism which operationally actuates system 10 in order that service or maintenance may be performed on the vehicle. At the end of the operational time interval, determined by the amount of money inserted, servicing system 10 becomes non-operational and either the operator removes the vehicle or resets system 10 operation by inserting additional monies.

Figure 1:
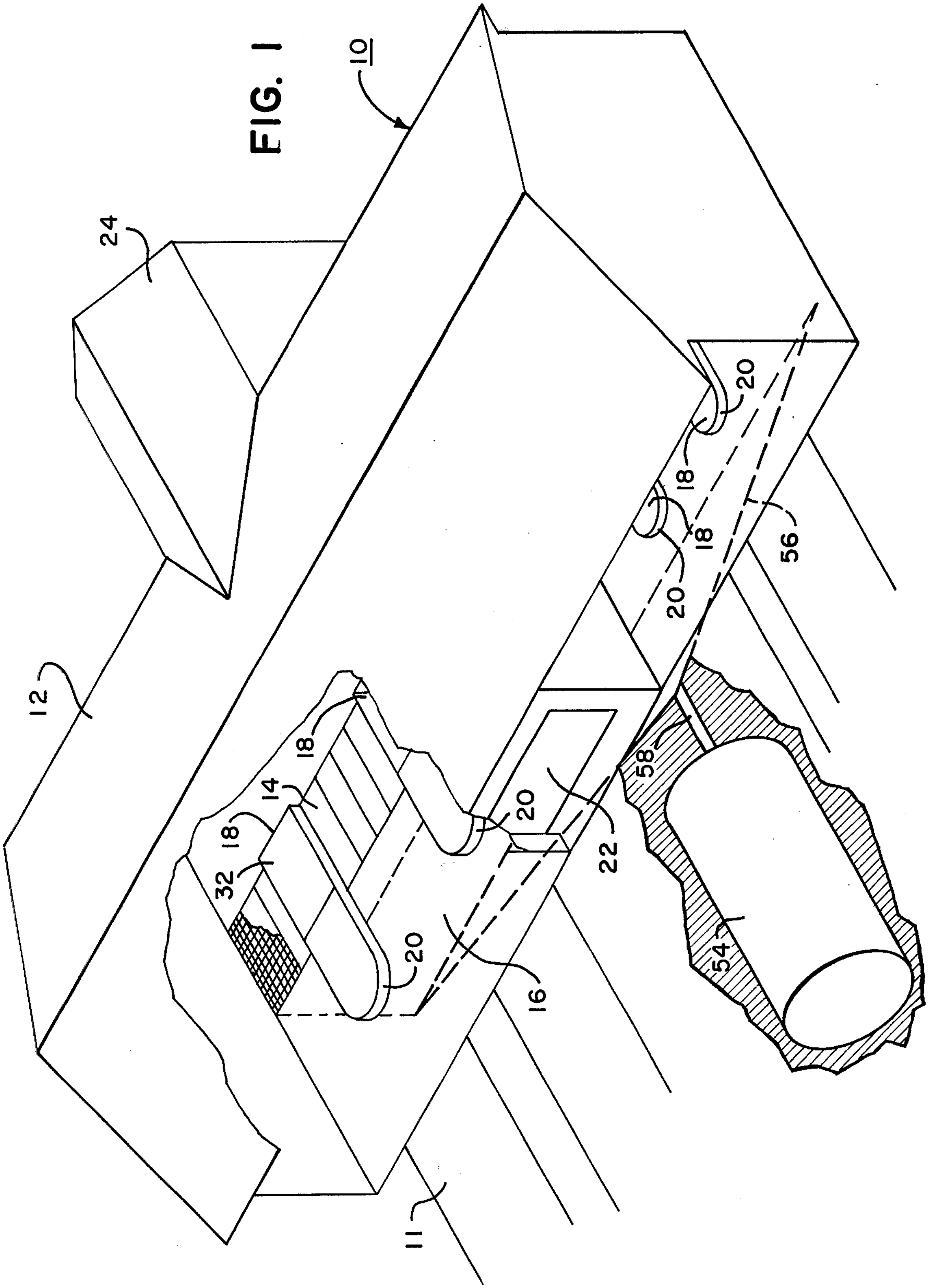
FIG. 1 is a perspective partially cut away view of the vehicle housing of the vehicle servicing system showing a plurality of locations where vehicles are serviced.

Vehicle servicing system 10, in general, includes vehicle housing or garage 12 having an upper level 14 and a lower level 16. Upper level 14 of housing 12 is substantially at ground level and adapted so that vehicles may be driven in for service work. The vehicles are driven into a predetermined positional location straddling guide members 18 which provide a mechanism for locating the vehicles in a particular location within upper level 14 of housing 12. The vehicles are driven into servicing location by passing over guide members 18 in a longitudinal direction with opposing pairs of transversely displaced tires on opposing transverse sides of guide members 18. Each of guide members 18 has a rear surface 20 which is tapered or otherwise roundedly shaped in order to guide the vehicle tires to opposing sides of members 18 when the vehicle is being positioned for servicing. As shown in FIG. 1, four guide members 18 are mounted on upper level 14, however, such is only representative of the fact that a plurality of members 18 may be provided in order that a multiplicity of vehicles may be serviced at one time. Each of guide members 18 may have a pair of transversely extending indents or mounds 34 formed on a frontal position thereof. Mounds 34 are positioned to permit tire insertion therebetween and act as a guide in longitudinally positioning the vehicle.

In overall concept, housing or garage 12 may include sales room 22 on upper level 14. Sales room 22 may contain vending machines or over the counter sales of parts and other vehicle maintenance equipment to aid operator's in servicing their vehicles. Additionally, housing 12 may include storage area 24 where parts and other equipment being sold in sales room 22 may be refurbished.

Figure 2:
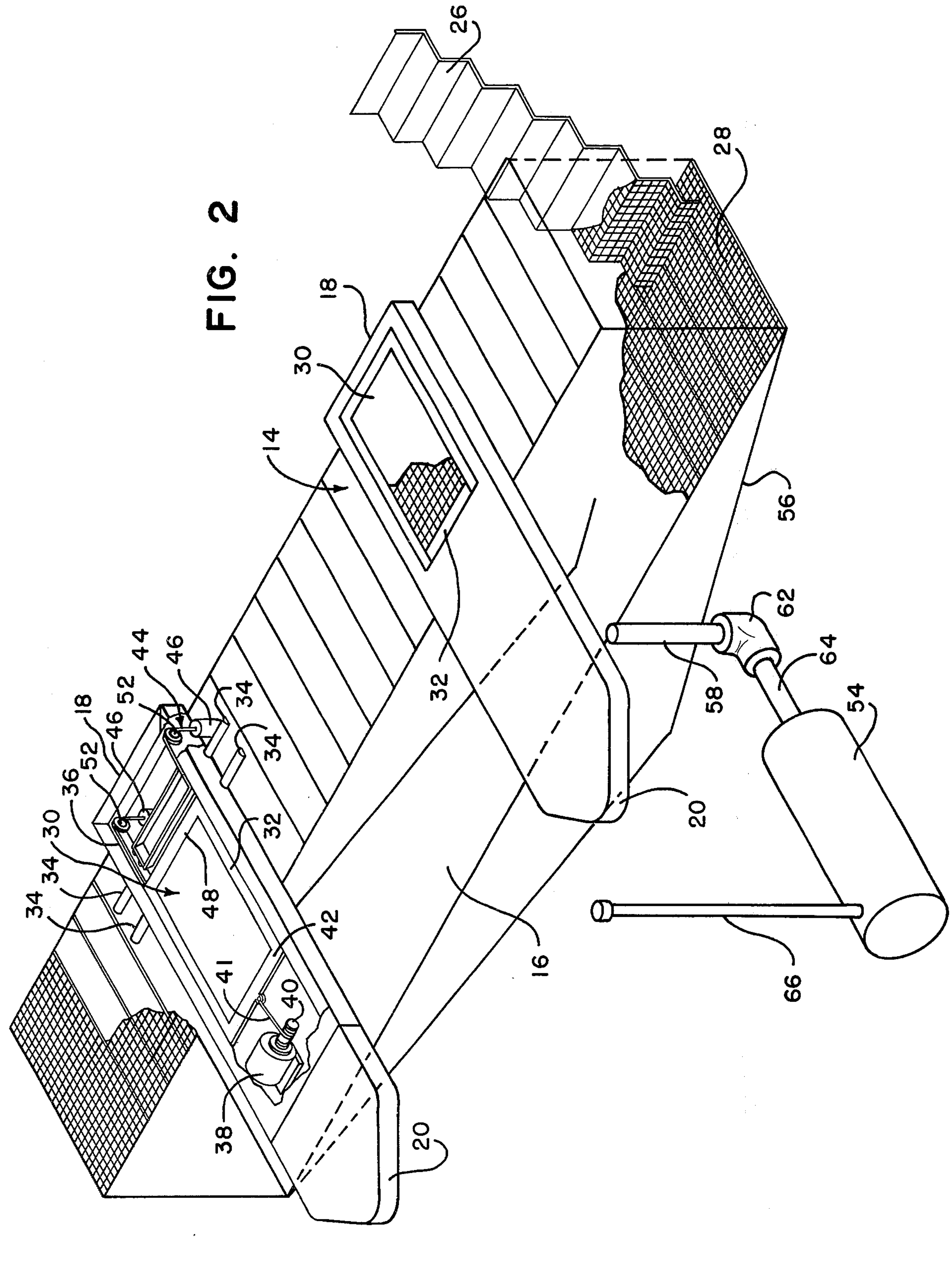
FIG. 2 is a perspective partially cut away view of the upper and lower levels of the vehicle housing showing the removeable door mechanism.
Figure 4:
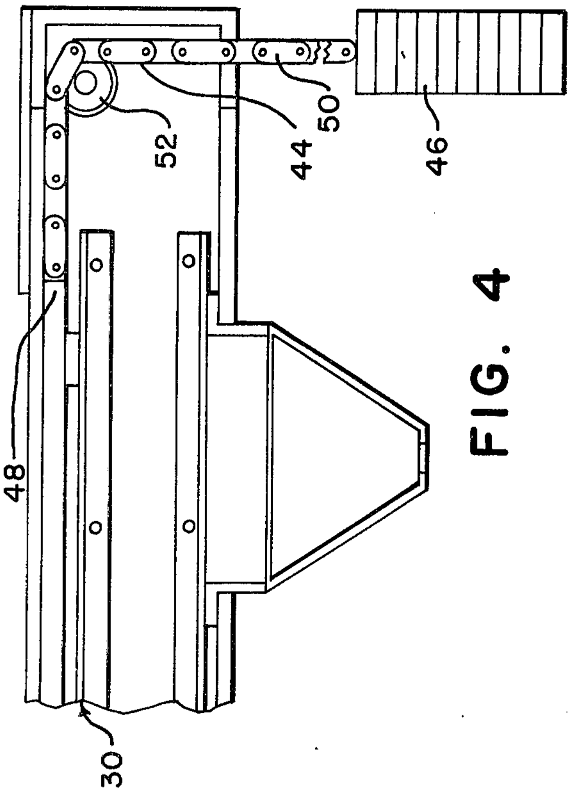
FIG. 4 is a side view of a portion of the removeable door mechanism.

Having purchased the necessary equipment or accessories, from sales room 22, the operator may proceed from upper level 14 to lower level or pit area 16. The operator walks down steps 26 into lower level 16 as shown in FIG. 2. Steps 26 may be grated in a manner similar to that of grated floor member 28 of lower level 16 for purposes to be hereinafter described. The operator may then station himself under his vehicle and actuate removeable door mechanism 30. Mechanism 30 is between upper and lower levels 14, 16 adjacent the underside of the positionally located vehicle. When mechanism 30 is actuated, door 32 is removed from under a portion of the vehicle in order that the operator has an unobstructed work area on the underside of his vehicle.

Door mechanism 30 includes door member 32 which is slideable in a longitudinal direction within a pair of longitudinally extending and transversely opposed track elements 36 formed within guide members 18. Mechanism 30 is provided for reversably sliding door member 32 from a first position blocking access to the underside of the vehicle from lower level 16 to a second position which provides access to the underside of the vehicle.

As shown in FIG. 2, removeable door mechanism 30 includes motor mechanism 38 which may be a gear motor with a reversing switch or some like mechanism. Extending from motor 38 is drum 40 which is rotatively actuated by motor 38. Cable 41 is fixedly secured to drum 40 and door rear portion 42 on opposing ends thereof. Thus, cable 41 operatively connects motor 38 to sliding door member 32. When door member 32 is in the first position relative to guide members 18, and motor 38 is actuated, drum 40 begins to rotate and cable 41 is wound around it. This causes a tensile loading in cable 41 and results in door member 32 being slideably displaced to the second position, thereby giving the operator access to the underside of the vehicle.

Actuation of motor 38 may be initiated through a standard timing mechanism which is well known in the art. The operator inserts a predetermined amount of money into the timing mechanism which initiates operation of motor 38 and maintains door member 32 in the second position or open position for a specific length of time. At the end of the time interval, a reversing switch on motor 38 is actuated to permit rotation of drum 40 in an opposite direction in order to permit door member 32 to return to the first or closed position through operation of closing or moving mechanism 44, shown in FIGS. 2, 3, and 4. It is obvious that the operator, at his option, may insert more money into the standard timing mechanism to maintain door member 32 in the second or open position, thereby permitting continued work on the vehicle. Such timing mechanisms are well known in industrial use, being utilized in selfservice car washes, washing machines and other coin operated mechanisms.

Closing or moving mechanism 44 includes a pair of counterweights 46 which are attached to frontal portion 48 of door member 32 on opposing transverse sides. Chain links 50 passing over sprocket element 52 are connected on opposing ends thereof to counterweights 46 and frontal portion 48 of door member 32. It is of course to be understood that a flexible cable passing over a pulley system may be substituted for chain links 50 and rotatable sprocket 52. In this manner, a vertical displacement of counterweights 46 results in a horizontal movement of door member 32 from an open position to a closed position. It will be understood that the weights of counterweights 46 will be adjusted to permit a gradual closing of door member 32 in order to negate any possible injury to the operator when door 32 is closed. Further, standard timing mechanism may be fitted with an audible alarm or some like mechanism which will sound or otherwise give warning that the open time interval is almost at an end.

Figure 3:
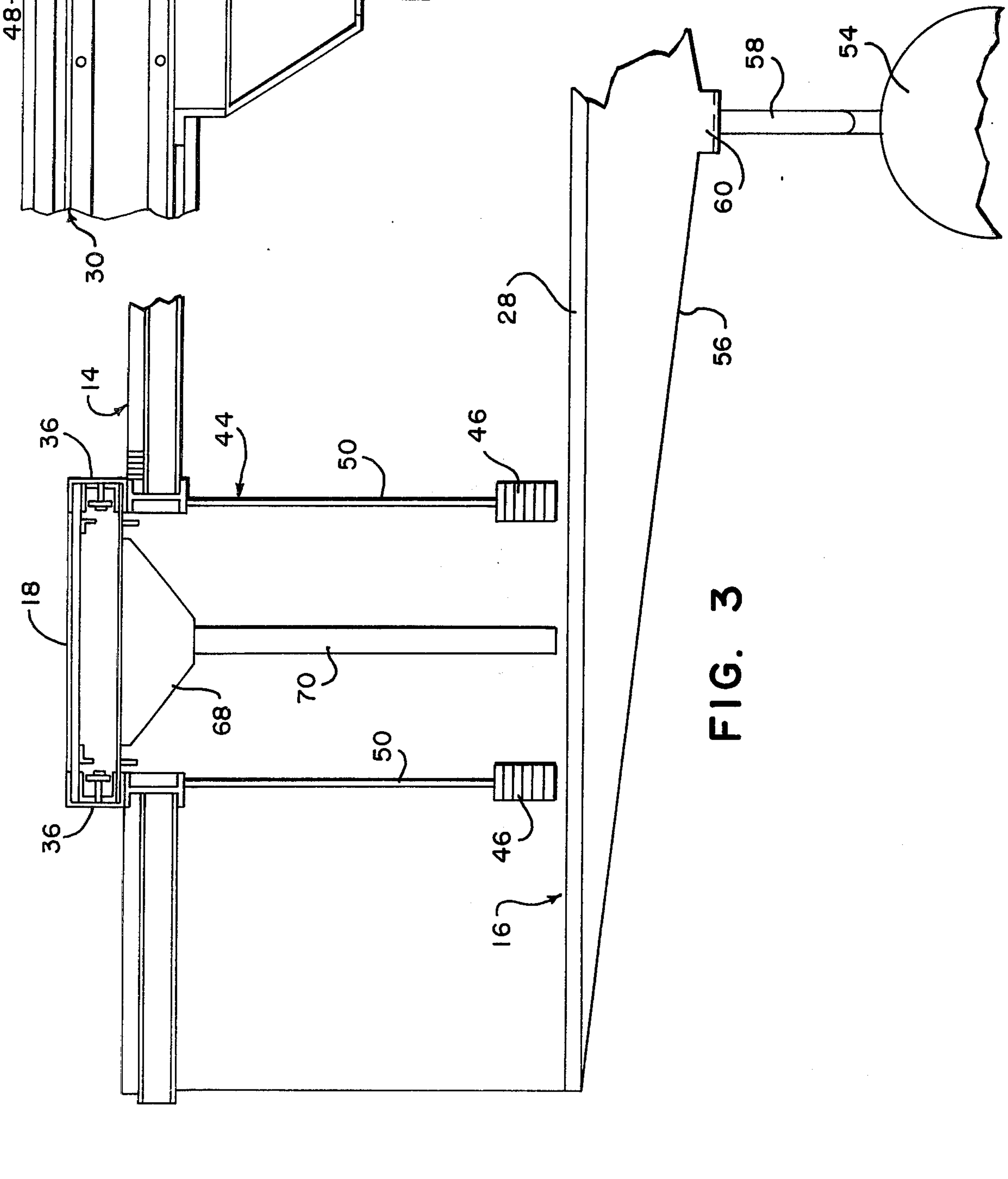
FIG. 3 is an elevational view of the vehicle servicing system showing the drain oil recovery system.

Vehicle servicing system 10 includes mechanisms for draining oil or other liquids from the vehicle being serviced and passing such to drain or recovery tank 54 through gravity assist. One form of recovering oil or other liquid is shown in FIGS. 1, 2, and 3. In this form of the invention lower level or pit area 16 includes first or grated floor member 28 which is vertically displaced from and passes substantially parallel to a horizontally positioned plane forming the floor of upper level 14. First floor member 28 is grated, as is shown in FIG. 2, to permit passage therethrough of the liquid being drained from the vehicle. It should be noted that floor 28 may be coated with an anti-skid coating in order that an operator will not slip on the floor since some oil may be splashed on the grating. Second floor member 56, being continuous in nature, passes under first grated floor 28 through its extension as is shown. Floor 56 is inclined downwardly with respect to floor 28, with floor 56 being connected to conduit 58. Conduit 58 interfaces with second floor member 56 at an area 60 which is maximally displaced from grated floor 28. Thus second floor 56, with its inclined walls, forms a funnel through which oil or other liquid may pass into conduit 58. The liquid to be recovered, then passes through elbow joint 62 into second conduit 64 and into recovery tank 54. Recovery tank 54 is mounted below the lowest point of second floor member 56 to permit drainage thereto by gravity assist. Tank 54, as shown in FIG. 2, may include vent member 66 passing in a vertical direction as is usual in such devices.

In FIG. 3, there is shown drain pan 68 positionally located under the vehicle mounted on upper level 14 of vehicle servicing system 10. Drain pan 68 is funnel shaped and connected to vertically directed pan conduit 70 as is shown. In this manner, liquid passing from the vehicle being serviced, flows into drain pan 68, into pan conduit 70 through grated floor 28 and onto inclined second floor 56 for eventual discharge into tank 54.

Figure 5:
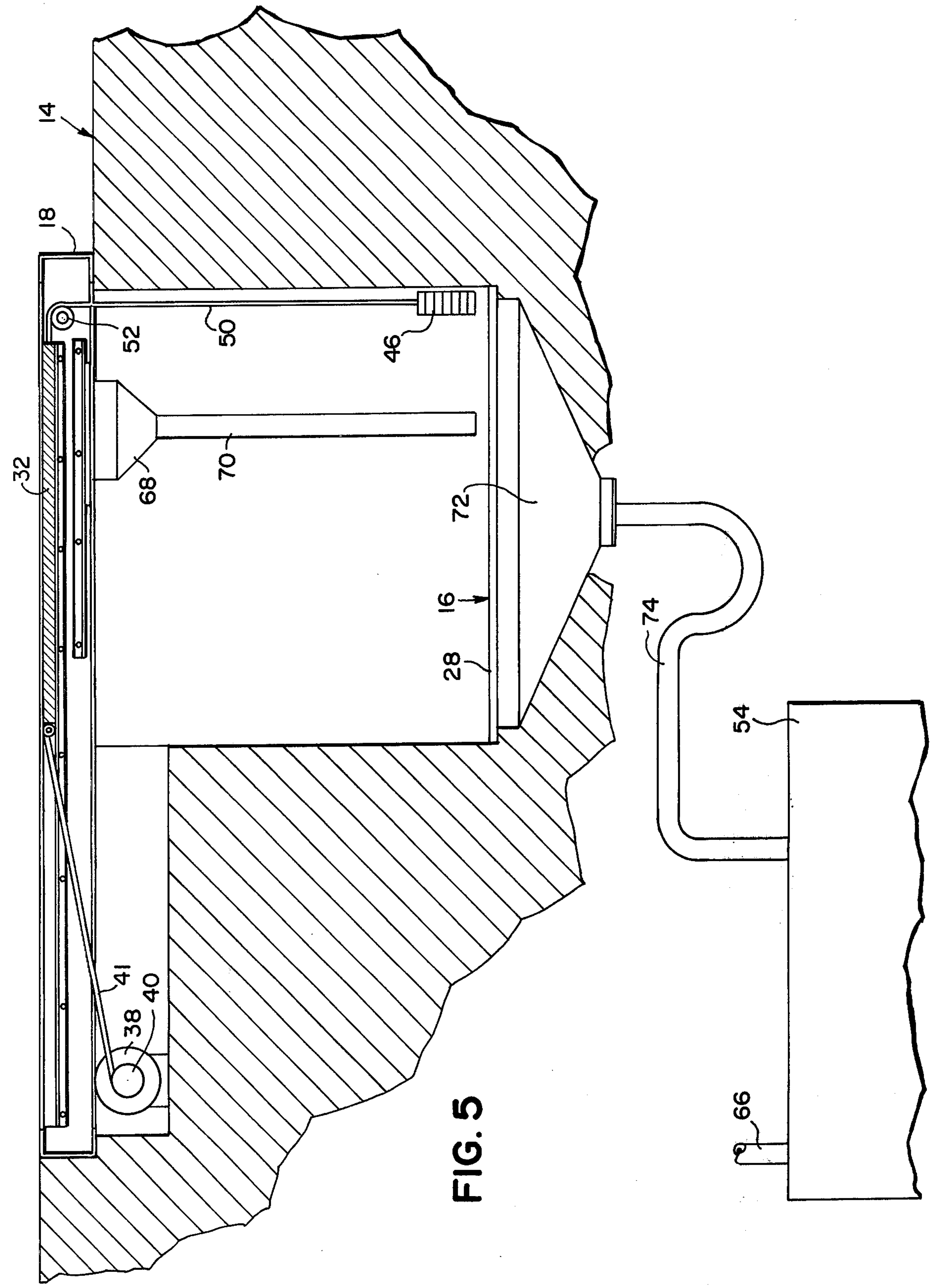
FIG. 5 is a side view of an embodiment of the vehicle servicing system.

Another embodiment of the present invention is shown in FIG. 5 where moveable drain pan 68 is positionally locatable under the vehicle being serviced. Liquid passing into funnel shaped drain pan 68 is directed through conduit 70 and grated floor 28 into secondary funnel member 72. Funnel member 72 is then connected to recovery tank 54 through conduit 74 as is shown. Recovery tank 54 is located beneath the lowest area of funnel member 72 and liquid drainage is through gravity assist. In this embodiment of the invention, each positional location for vehicles has its own secondary funnel member 72 as opposed to the embodiment as shown in FIG. 3, where inclined floor 56 served as the fluid transport means for all vehicles being serviced.

Figure 6:
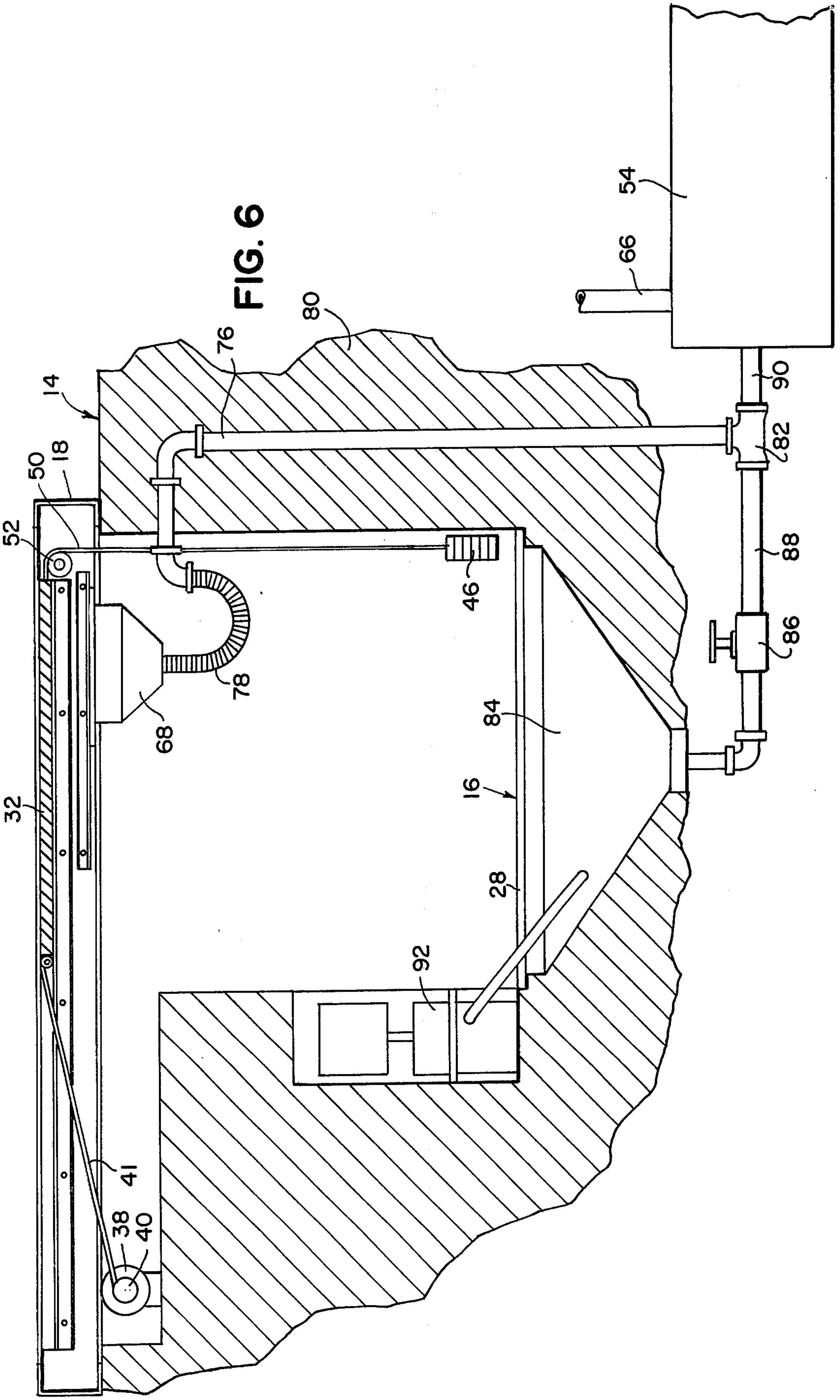
FIG. 6 is a side view of an embodiment of the vehicle servicing system showing a oil drain conduit embedded in a wall of the vehicle housing and a water reservoir with oil skimming apparatus.

Another embodiment of the present invention is shown in FIG. 6, where drain pan 68 is connected to rigid conduit 76 through flexible hosing 78. In this manner, pan 68 may be moved within pit area 16 to different portions of the vehicle being drained. Rigid conduit passes downwardly within housing wall 80 to T joint 82 from which oil or other liquid passes into tank 54. Additionally water reservoir 84 below grated floor 28 maintains a predetermined level of water to aid in fire control. Valve 86, when in the closed position obstructs the flow of water into tank 54 through conduits 88 and 90. Oil which accidently is splashed through floor 28 may form a coating on top of the water contained in water reservoir 84. Oil skimmer mechanism 92, well known in the art, may be mounted within wall 80 to remove any oil from the surface of the water. In this manner, through use of rigid conduit 76 embedded in wall 80 in combination with water reservoir 84, the hazard of fire is minimized in utilization of vehicle servicing system 10.

While the system and devices have been shown and described in their preferred embodiments, it will be understood that the variations in the specific construction and arrangements of parts may be made without departing from the invention.

What is claimed is:

1. A vehicle servicing system comprising:

a. vehicle housing means having an upper level and a lower level, said lower level having a first floor member vertically displaced from and passing substantially parallel to a horizontal plane of said upper level, said first floor member being grated to permit passage of oil therethrough, said lower level further having a second floor member under said lower level first floor member adapted to transport said oil passing through said grated first floor member to a drain tank, said second floor member being inclined downwardly with respect to said first floor member, said second floor member being connected to said drain tank positioned below said second floor member at an area being substantially maximally displaced from said grated first floor member;

b. means for positioning at least one vehicle in a predetermined location within said upper level of said vehicle housing means;

c. removeable door means between said upper and lower levels of said vehicle housing means, said door means being located under said vehicle when said vehicle is in said predetermined location, said door means being removeable from under said vehicle responsive to an operator's control for servicing said vehicle from said lower level of said vehicle housing means;

d. means for draining oil from said vehicle within said vehicle housing means, said oil being drained from said vehicle to be collected in said drain tank through gravity assist; and, e. a moveable drain pan being positionally locatable under said vehicle, said drain pan being operatively connected to said drain tank to permit oil passage thereto through gravity assist, said moveable drain pan further including conduit means passing substantially in a vertical manner from said drain pan on one end to said grated floor member on a second end for transporting said oil from said vehicle through said conduit, said grated floor member and into said drain tank.

2. The vehicle servicing system as recited in claim 1 including funnel wall means mounted below said grated floor member, said funnel wall means being operatively connected on opposing ends to said drain tank and said grated floor member for directing said oil passing through said grated floor member to said drain tank.

* * * * *